(12) United States Patent
Klos

(10) Patent No.: US 7,160,630 B2
(45) Date of Patent: Jan. 9, 2007

(54) CORROSION RESISTANT ARTICLE AND METHOD OF PRODUCTION THEREOF

(75) Inventor: Klaus-Peter Klos, Trebur (DE)

(73) Assignee: Elisha Holding LLC, Moberly, MO (US)

( * ) Notice: Subject to any disclaimer, the term of this patent is extended or adjusted under 35 U.S.C. 154(b) by 0 days.

(21) Appl. No.: 11/140,710

(22) Filed: May 31, 2005

(65) Prior Publication Data

US 2006/0228575 A1    Oct. 12, 2006

(30) Foreign Application Priority Data

Apr. 11, 2005  (EP)  ................... 05007883

(51) Int. Cl.
*B32B 15/02* (2006.01)
*B32B 15/04* (2006.01)
*B32B 15/18* (2006.01)
*F16B 35/00* (2006.01)
*F16B 37/00* (2006.01)

(52) U.S. Cl. ............... 428/658; 428/659; 428/681; 428/632; 428/332; 428/446; 428/450; 411/378; 411/427

(58) Field of Classification Search ........... 428/681, 428/658, 659, 682, 632, 680, 674, 212, 220, 428/332, 426, 432, 422, 446, 450; 411/378, 411/427

See application file for complete search history.

(56) References Cited

U.S. PATENT DOCUMENTS 4,169,916 A  10/1979 Tsutsui et al. ............ 428/447
4,555,445 A  11/1985 Frey et al.
5,871,668 A   2/1999 Heimann et al. ....... 252/389.62
6,153,080 A  11/2000 Heimann et al. ............ 205/199
2003/0170483 A1  9/2003 Hillebrand et al.
2004/0127625 A1* 7/2004 Clerici et al. ............... 524/437
2004/0137238 A1* 7/2004 Clerici et al. ............... 428/446
2005/0037227 A1  2/2005 Yasuhiko

FOREIGN PATENT DOCUMENTS

| EP | 1 504 891 A1 | 8/2003 |
| EP | 1 420 086 A1 | 11/2003 |
| JP | 2003306638 | 10/2003 |
| WO | WO 03/066937 A2 | 8/2003 |

* cited by examiner

*Primary Examiner*—Michael E. Lavilla

(57) ABSTRACT

The disclosure relates to a corrosion resistant article comprising a metal body and a protective coating applied on at least one surface of said metal body, said protective coating comprising: (a) a zinc layer comprising metallic zinc; (b) a silicate layer comprising at least one silicate; and (c) a lubricant layer comprising at least one lubricant such as, for example, polyethylene wax. In particular, the disclosure relates to a corrosion resistant bolt and/or nut having a protective coating for use in motor vehicles. The protective coating is substantially free of chromates and phosphates and, hence, environmentally acceptable. The article has an excellent coefficient of friction, temperature resistance and anti-corrosion properties.

20 Claims, 1 Drawing Sheet

CORROSION RESISTANT ARTICLE AND METHOD OF PRODUCTION THEREOF

This application claims the benefit of European Patent Application No. 05007883.1, filed on Apr. 11, 2005. The disclosure of the previously identified patent application is hereby incorporated by reference.

FIELD OF THE INVENTION

The instant invention relates to corrosion resistant articles and a method of production thereof. In particular, the instant invention relates to corrosion resistant articles comprising a threaded surface for engaging a corresponding threaded mating part such as, for example, bolts and nuts. The corrosion resistant article of the instant invention can be used, for example, as a fastening element in motor vehicles such as, for example, a bolt or a nut for fastening the wheel rim to the wheel hub of an automobile ("wheel bolt" or "wheel nut").

BACKGROUND OF THE INVENTION

Safety sensitive automobile components such as wheel bolts and wheel nuts for motor vehicles must meet strict requirements with regard to corrosion and wear resistance as well as to friction properties. Such automobile parts are exposed to severe outdoor environments including road water and rock salt and, hence, are required to have high degrees of corrosion resistance, impact strength and mechanical wear resistance. Furthermore, automobile wheel bolts and wheel nuts undergo severe temperature changes during the operation of an automobile. Hence, it is required that such bolts and nuts do not loosen when they undergo temperature changes and, at the same time, the thread does not become stuck due to corrosion. Generally, the automobile industry requires that bolts and nuts for this purpose have a total coefficient of friction $\mu_{total}$ as determined by DIN 946 of the German Institute for Standards of 0.05 to 0.18. Furthermore, it is required that this value remains substantially constant even after several times of fastening and loosening. In addition, the automobile industry requires that the loosening torque of such bolts and nuts remain in a specified range when the part is heated to different temperatures. Bolts and nuts without protective coating do not meet such requirements. It is, therefore, necessary that the bolts and nuts be so coated as to resist both chemical corrosion and mechanical damage or wear and as to exhibit the required friction properties.

Furthermore, environmental regulations require manufacturers of automobiles to significantly reduce or even eliminate the amount of environmentally incompatible substances in automobiles. On the list of substances that are considered environmentally incompatible is hexavalent chromium, a substance that is conventionally employed in galvanization processes used for imparting anti-corrosion properties to automobile parts. It is, therefore, desirable to produce bolts and nuts for automobiles that do not contain any environmentally incompatible substances such as hexavalent chromium.

In addition, the automotive industry has enormous quantity demands, as in the case of nuts and bolts. Hence, it is essential that any method of manufacturing bolts and nuts has a high production capacity that can meet the quantity demands of the automotive industry.

Conventional wheel bolts and wheel nuts for use in automobiles contain chromium (VI) based coating systems. Such conventional wheel bolts and wheel nuts generally contain a protective coating of the following type: (a) a Zn or Zn/Ni layer; (b) a chromium (VI) based layer; and (c) a lubricant layer. While such systems have acceptable corrosion, wear and friction properties, the disadvantage of chromium (VI) based systems is their environmental incompatibility.

Silicates have been used in electrocleaning operations to clean steel, tin, among other surfaces. Electrocleaning is typically employed as a cleaning step prior to an electroplating operation. Using "Silicates as Cleaners in the Production of Tinplate" is described by L. J. Brown in February 1966 edition of *Plating*; hereby incorporated by reference.

Processes for electrolytically forming a protective layer or film by using an anodic method are disclosed by U.S. Pat. No. 3,658,662 (Casson, Jr. et al.), and United Kingdom Patent No. 498,485; both of which are hereby incorporated by reference.

U.S. Pat. No. 5,352,342 to Riffe, which issued on Oct. 4, 1994 and is entitled "Method and Apparatus for Preventing Corrosion of Metal Structures", describes using electromotive forces upon a zinc solvent containing paint; hereby incorporated by reference.

The instant invention solves problems associated with conventional fastening elements by providing an article such as wheel bolt or a wheel nut for use in automobiles that has improved corrosion, wear, and friction properties and is environmentally acceptable. Further benefits of the invention will become apparent from a consideration of the ensuing description and drawings.

SUMMARY OF THE INVENTION

The instant invention provides a corrosion resistant article comprising a metal body and a protective coating applied on at least one surface of said metal body, said protective coating comprising: (a) a zinc layer comprising zinc; (b) a silicate layer comprising at least one silicate; and (c) a lubricant layer comprising at least one lubricant, wherein the article has a total coefficient of friction $\mu_{total}$ as determined by DIN 946 of about 0.05 to about 0.20.

In particular, the instant invention provides a multi-layer protective coating for metal articles—such as fastening elements for use in motor vehicles—which satisfies the problems discussed above in that it is highly resistant to chemical attack, has good friction properties and shows excellent temperature resistance.

The multi-layer protective coating of the instant invention is substantially free of chromates (hexavalent and trivalent) and phosphates and, hence, is environmentally safe.

The multi-layer coated metal article of the instant invention can possess improved corrosion resistance, increased electrical resistance, heat resistance, flexibility, resistance to stress crack corrosion, adhesion to topcoats, among other properties. The treated surface imparts greater corrosion resistance (e.g., ASTM B-117), among other beneficial properties, than conventional trivalent or hexavalent chromate systems.

In accordance with one embodiment of the invention, the articles of the instant invention have a ASTM B117 exposure to white rust of greater than, for example, about 200 hours, preferably greater than, for example, about 400 hours and most preferred greater than, for example, about 1000 hours.

In the course of the instant invention it was found that bolts and nuts that have been coated with the protective coating of the instant invention, apart from having good corrosion resistance, also possess excellent friction properties and, in addition, show excellent temperature resistance.

Thus, it was found that the articles of the instant invention have a total coefficient of friction $\mu_{total}$ as determined by DIN 946 (October 1991) of the German Institute for Standards of about 0.05 to about 0.20. Furthermore, it was found that the total coefficient of friction $\mu_{total}$ increases by less than about 0.05, in particular by less than about 0.03, after the article has been fastened repeatedly for 10 times.

Furthermore, it was found that the articles of the instant invention have a loosening torque that amount to at least 50% of the fastening torque when measured at at least one (preferably all) of the following conditions:

(a) fastening and loosening the article at 23° C.;

(b) subsequent to the previous step: fastening the article at 23° C., increasing the temperature of the article to 150° C., loosening the article after 1 h at 150° C.;

(c) subsequent to the previous steps: fastening the article at 150° C., increasing the temperature of the article to 200° C., loosening the article after 1 h at 200° C.; and (d) subsequent to the previous steps: fastening the article at 200° C., decreasing the temperature of the article to 23° C., loosening the article after 1 h at 23° C.

In fact, the ratio R of the loosening torque N2 (in Nm) to the fastening torque N1 (in Nm) of the articles of the instant invention as determined by the equation R [%]=100×N2/N1 was found to be greater 50% for each of the conditions (a) to (d) as defined above.

Due to their excellent corrosion and temperature resistance and friction properties, the articles of the instant invention can be used as safety sensitive automobile components such as wheel bolts and wheel nuts.

The invention further provides a process for manufacturing multilayer coated corrosion resistant articles, such as fastening elements for automobiles. The inventive process is a marked improvement over conventional methods by obviating the need for solvents or solvent containing systems to form a corrosion resistant layer, e.g., a mineral layer. In contrast, to conventional methods the inventive process can be substantially solvent free. By "substantially solvent free" it is meant that less than about 5 wt. %, and normally less than about 1 wt. % volatile organic compounds (V.O.C.s) are present in the electrolytic environment.

The inventive process is also a marked improvement over conventional methods by reducing, if not eliminating, chromate and/or phosphate containing compounds (and issues attendant with using these compounds such as waste disposal, worker exposure, among other undesirable environmental impacts). While the inventive process can be employed to enhance chromated or phosphated surfaces, the inventive process can replace these surfaces with a more environmentally desirable surface. The inventive process, therefore, can be "substantially chromate free" and "substantially phosphate free" and in turn produce articles that are also substantially chromate (hexavalent and trivalent) free and substantially phosphate free. The inventive process can also be substantially free of heavy metals such as chromium, lead, cadmium, cobalt, barium, among others. By substantially chromate free, substantially phosphate free and substantially heavy metal free it is meant that less than 5 wt. % and normally about 0 wt. % chromates, phosphates and/or heavy metals are present in a process for producing an article or the resultant article. In addition to obviating chromate containing processes, the inventive method forms a layer having greater heat resistance, flexibility, among other properties, than conventional chromate coatings. The improved heat resistance broadens the range of processes that can be performed subsequent to forming the inventive layer, e.g., heat cured topcoatings, bending, deforming, stamping/shaping, riveting, among other processes.

In contrast to conventional electrocleaning processes, the instant invention employs silicates in an electrolytic (e.g. cathodic) process or in an electroless process for forming a mineral layer upon the substrate. Conventional electrocleaning processes sought to avoid formation of oxide containing products such as greenalite whereas the instant invention relates to a method for forming silicate containing products, e.g., a mineral.

CROSS REFERENCE TO RELATED PATENTS AND PATENT APPLICATIONS

The subject matter herein is related to the following commonly assigned patents and patent applications: U.S. Pat. Nos. 6,149,794; 6,258,243; 6,153,080; 6,322,687; 6,572,756 and U.S. patent application Ser. Nos. 09/816,879; 09/775,072; 09/814,641; 10/211,051; 10/211,094; 10/211,029, 10/359,402; and 10/831,581. The disclosure of the foregoing patents and patent applications is hereby incorporated by reference.

DETAILED DESCRIPTION

Figure 1:
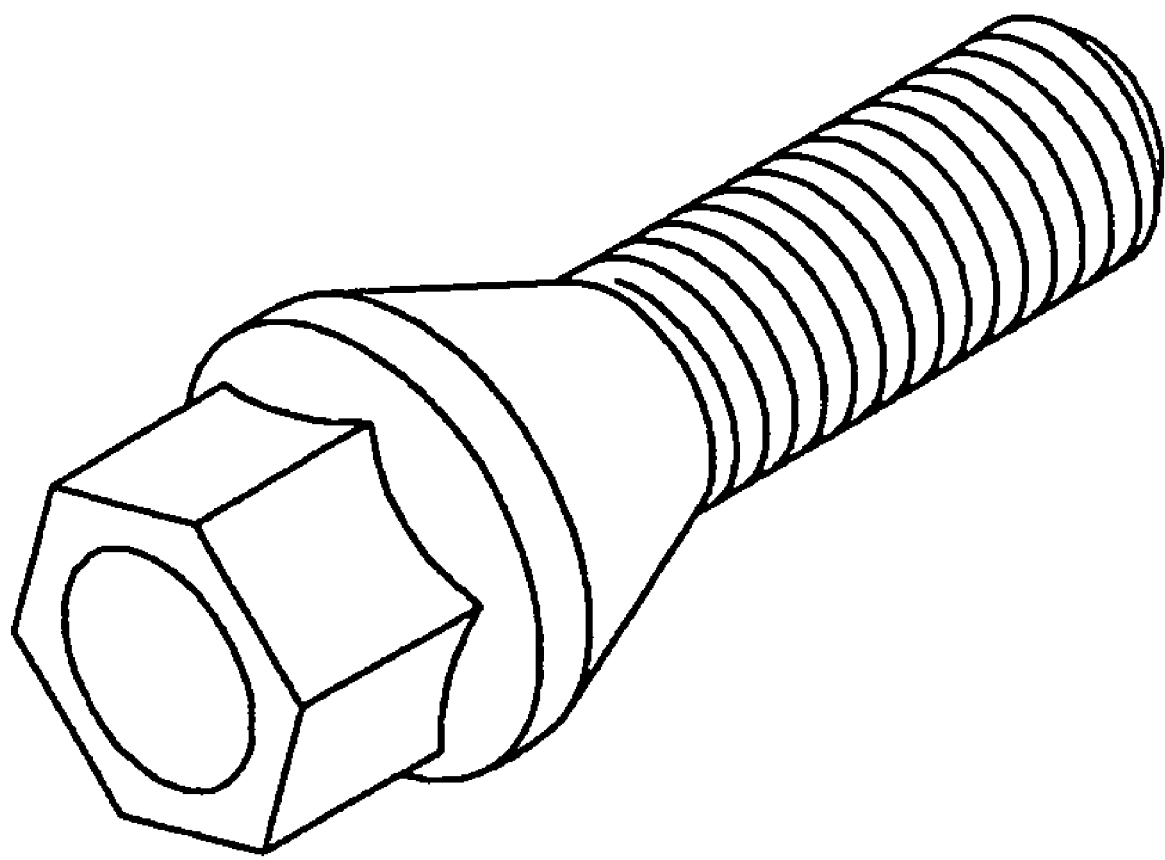
FIG. 1 is a perspective view of a corrosion resistant coated bolt according to an embodiment of the instant invention as described in Example 1.

The corrosion resistant articles according to the instant invention are usually a metal body such as steel articles having a protective coating applied thereon, such as, for example, fastening elements for use in automobiles. In particular, the corrosion resistant articles according to the instant invention are usually fastening elements comprising a threaded surface for engaging a corresponding threaded mating part such as, for example, bolts and nuts (especially bolts and nuts for fastening automobile wheels).

The corrosion resistant article according to the instant invention comprises a metal body and a protective coating applied on at least one surface of said metal body. The protective coating is normally applied upon an exterior surface (as is, for example, the case for bolts) but can also be applied upon interior surfaces (as is, for example, the case in nuts).

The metal body to be coated in accordance with the instant invention can possess a wide range of sizes and configurations, e.g., tubes, fibers, coils, sheets including perforated acoustic panels, chopped wires, drawn wires or wire strand/rope, rods, couplers (e.g., hydraulic hose couplings), fibers, particles, fasteners (including industrial and residential hardware), brackets, nuts, bolts, rivets, washers, cooling fins, stamped articles, powdered metal articles, among others. According to one embodiment of the instant invention, the metal body is a fastening element comprising a threaded surface for engaging a corresponding threaded mating part.

The term "metal body" refers to a metal article or body as well as a non-metallic or non-conductive substrate having at least one surface coated with an electrically conductive material. Examples of suitable metal articles or bodies comprise at least one member selected from the group consisting of galvanized surfaces, hot-dipped galvanized, sheradized surfaces, zinc, iron, steel, brass, copper, silver, barium, calcium, strontium, titanium, zirconium, tin, lead, manganese, iron, iron alloys, nickel, tin, aluminum, lead, cadmium, magnesium, alloys thereof such as zinc-nickel alloys, tin-zinc alloys, zinc-cobalt alloys, and zinc-iron alloys, among others. Suitable non-conductive substrates having at least one surface coated with an electrically conductive material include, for example, a metallized polymeric article or sheet, ceramic materials coated or encapsulated within a metal, among others. Examples of metallized polymer comprise at least one member selected from the group of polycarbonate, acrylonitrile butadiene styrene (ABS), rubber, silicone, phenolic, nylon, PVC, polyimide, melamine, polyethylene, polyproplyene, acrylic, fluorocarbon, polysulfone, polyphenyene, polyacetate, polystyrene, epoxy, among others. Conductive surfaces can also include carbon or graphite as well as conductive polymers (polyaniline for example).

Suitable metal bodies for use as bolts and nuts in motor vehicles are, for example, those as described in DIN 13, DIN 78, DIN 267, DIN ISO 898, DIN ISO 4759, DIN ISO 5855, ISO 68 (1973), and ISO 885 (1976) of the German Institute for Standards.

Depending on the desired properties of the corrosion resistant article and on the degree of staining it may be beneficial to clean the metal body before it enters the coating process, such as by use of suitable electrolytic degreasing; preferably with a method which avoids excessive hydrogen diffusion into the article, and decapping operations as are typically used in the art of zinc plating and having due regard to the particular metal body to be coated. If desired, the articles can be cleaned by an acid such as hydrochloric or citric acid, rinsed with water, and rinsed with an alkali such as sodium hydroxide, rinsed again with water. The cleaning and rinsing can be repeated as necessary. If desired the acid/alkali cleaning can be replaced with a conventional sonic cleaning apparatus.

In accordance with the instant invention the metal body is coated with a protective coating. The protective coating comprises at least the following layers:
    a zinc layer comprising metallic zinc;
    a silicate layer comprising at least one silicate;
    a lubricant layer comprising at least one lubricant.

The protective coating is not limited to the aforesaid layers but may comprise, for example, additional layers such as, for example, an a corrosion protection layer interposed between the silicate layer and the lubricant layer.

Whereas there is no restriction with regard to the method by which the zinc layer is applied, according to one aspect of the invention the zinc layer is an electrolytically applied zinc that can be applied by conventional electrolytic methods. Such electrolytic methods are generally known and widely used in the art. The zinc layer typically has a thickness of, for example, about 1 to about 75 micrometers; in particular, the zinc layer typically has a thickness of, for example, about 15 to about 35 micrometers.

Whereas there is no restriction with regard to the method by which the silicate layer is applied, according to one aspect of the invention the silicate layer is formed by an electrolytic (e.g. cathodic) process as will be described in more detail below. The silicate layer typically has a thickness of, for example, about 50 to 800 Å.

On top of the silicate layer or, alternatively, on top of an (optional) additional corrosion protection layer is applied a lubricant layer containing a lubricant, such as, for example, polyethylene wax. The lubricant layer typically has a thickness of, for example, about 0.01 to about 5 micrometers, in particular of about 0.1 to about 1 micrometer.

It is believed that the presence of the silicate layer—in combination with the other layers of the protective coating—is largely responsible for such beneficial properties of the corrosion resistant article of the instant invention as improved corrosion resistance, improved friction properties, increased electrical resistance, heat resistance, flexibility, and resistance to stress crack corrosion, among other properties.

Accordingly, the instant invention also relates to a method of manufacturing a corrosion resistant article comprising a metal body and a protective coating applied on at least one surface of said metal body, said method comprising:
    electrolytically coating said metal body with zinc (or zinc alloys such as zinc nickel, zinc iron, tin zinc, among other zinc containing layers) to form a zinc layer;
    immersing the coated metal body into a medium comprising at least one silicate and having a basic pH and wherein said medium is substantially free of chromates to form a silicate layer; and
    contacting the coated metal body with a lubricant medium containing a lubricant to form a lubricant layer.

If desired, the zinc layer can be formed by immersion in molten zinc metal (hot dipped galvanization), mechanical plated, among other methods for forming a zinc containing layer. The coating of the metal body can be accomplished in various ways, some of which will be explained in more detail by way of example in the following:

1. Zinc Layer

The uncoated metal bodies are first are advanced into zinc coating equipment wherein a zinc layer is applied.

For the purpose of the present invention it is desirable that the zinc layer is a finely crystalline, highly homogenous zinc layer. Whereas any suitable method can be used, zinc coating will typically be accomplished by galvanic methods, i.e. by introducing the metal body into a zinc plating bath using an acidic electrolyte containing $Zn^{2+}$ ions and applying an electric current to cathodically precipitate finely crystalline zinc. The electrolytic zinc plating may take place by conventional barrel plating techniques. Such processes are widely known in the art and are readily apparent to a person of ordinary skill in the art.

Examples of suitable zinc plating solutions include the following components per liter of solution:
    25–45 g/l $Zn^{2+}$ (e.g. as ZnCl2)
    130–150 g/l chloride (e.g. as $ZnCl_2$ and KCl)
    15–25 g/l boric acid
    additives: wetting agents and brighteners
    pH=5.5–6.0

By the term "zinc layer" it is meant any layer that contains metallic zinc or an alloy thereof such as Zn/Ni, Zn/Fe, Sn/Zn, among other zinc containing layers. Thus, the zinc layer of the instant invention can also contain additional components besides metallic zinc. For example, it is possible to apply a Zn/Ni layer. A Zn/Ni layer can be applied in a similar manner as a Zn layer by conventional electrolytic methods that are generally known and widely used in the art. In Zn/Ni plating the electrolyte usually contains hydrochloric acid rather than sulfuric acid.

The zinc layer typically has a thickness of, for example, about 0.1 to about 50 micrometers; in particular, the zinc layer typically has a thickness of, for example, about 5 to about 35 micrometers.

2. Silicate Layer

Subsequently, the zinc plated articles ("substrates") are advanced into mineral coating equipment wherein a silicate layer ("mineral layer", "mineral coating") is applied over the zinc layer.

The silicate layer can be applied by a cathodic method for forming a protective layer upon a metallic or metal containing substrate (e.g., the protective layer can range from about 10 to about 2,500 Angstroms thick). The cathodic method is normally conducted by contacting (e.g., immersing) a substrate having an electrically conductive surface into a silicate containing bath or medium wherein a current is introduced to (e.g., passed through) the bath and the substrate is the cathode.

The inventive process can form a mineral layer comprising an amorphous matrix surrounding or incorporating metal silicate crystals upon the substrate. The characteristics of the mineral layer are described in greater detail in the copending and commonly assigned patent applications listed below.

The instant invention relates to a process for depositing or forming a beneficial surface (e.g., a mineral containing coating or film) upon a metallic or an electrically conductive surface. The process employs a silicate medium, e.g., containing soluble mineral components or precursors thereof, and utilizes an electroless or an electrically enhanced method to treat an electrically conductive surface (e.g., to obtain a mineral coating or film upon a metallic or conductive surface). By "mineral containing coating", "mineralized film" or "mineral" it is meant to refer to a relatively thin coating or film which is formed upon a metal or conductive surface wherein at least a portion of the coating or film comprises at least one metal containing mineral, e.g., an amorphous phase or matrix surrounding or incorporating crystals comprising a zinc disilicate. Mineral and Mineral Containing are defined in the previously identified Copending and Commonly Assigned Patents and Patent Applications; incorporated by reference. By "electrolytic" or "electrodeposition" or "electrically enhanced", it is meant to refer to an environment created by introducing or passing an electrical current through a silicate containing medium while in contact with an electrically conductive substrate (or having an electrically conductive surface) and wherein the substrate functions as the cathode. By "metal containing", "metal", or "metallic", it is meant to refer to sheets, shaped articles, fibers, rods, particles, continuous lengths such as coil and wire, metallized surfaces, among other configurations that are based upon at least one metal and alloys including a metal having a naturally occurring, or chemically, mechanically or thermally modified surface. Typically a naturally occurring surface upon a metal will comprise a thin film or layer comprising at least one oxide, hydroxides, carbonates, sulfates, chlorides, among others. The naturally occurring surface can be removed or modified by using the inventive process.

The electrolytic environment can be established in any suitable manner including immersing the substrate, applying a silicate containing coating upon the substrate and thereafter applying an electrical current, among others. The preferred method for establishing the environment will be determined by the size of the substrate, electrodeposition time, applied voltage, among other parameters known in the electrodeposition art. The effectiveness of the electrolytic environment can be enhanced by supplying energy in the form of ultrasonic, laser, ultraviolet light, RF, IR, among others. The inventive process can be operated on a batch or continuous basis.

The silicate containing medium can be a fluid bath, gel, spray, among other methods for contacting the substrate with the silicate medium. Examples of the silicate medium comprise a bath containing at least one silicate, a gel comprising at least one silicate and a thickener, among others. The medium can comprise a bath comprising at least one of ammonium silicate, potassium silicate, calcium silicate, lithium silicate, sodium silicate, compounds releasing silicate moieties or species, among other silicates. The bath can comprise any suitable polar carrier such as water, alcohol, ethers, among others. Normally, the bath comprises sodium silicate and de-ionized water and optionally at least one dopant. Typically, the at least one dopant is water soluble or dispersible within an aqueous medium.

The silicate containing medium typically has a basic pH. Normally, the pH will range from greater than about 9 to about 13 and typically, about 10 to about 11. The medium is normally aqueous and can comprise at least one water soluble or dispersible silicate in an amount from greater than 0 to about 40 wt. %, usually, about 3 to 15 wt. % and typically about 10 wt. %. The silicate medium can further comprise at least one water dispersible or soluble dopant. The silicate containing medium is also normally substantially free of heavy metals, chromates and/or phosphates.

The silicate containing medium can also include silica. The silica can be colloidal with a particle size ranging from about 10 nm to about 50 nm. The size of particles in the medium ranges from about 10 nm to 1 micron and typically about 0.05 to about 0.2 micron. The medium can have a turbidity of about 10 to about 850, typically about 50 to about 300 Nephelometric Turbidity Units (NTU) as determined in accordance with conventional procedures.

The electrolytic environment can be preceded by and/or followed with conventional post and/or pre-treatments known in this art such as cleaning or rinsing, e.g., immersion/spray within the treatment, sonic cleaning, double counter-current cascading flow; alkali or acid treatments, among other treatments. By employing a suitable post-treatment the solubility, corrosion resistance (e.g., reduced white rust formation when treating zinc containing surfaces), sealer and/or topcoat adhesion, among other properties of surface of the substrate formed by the inventive method can be improved. If desired, the post-treated surface can be sealed, rinsed and/or topcoated, e.g., silane, epoxy, latex, fluoropolymer, acrylic, titanates, zirconates, carbonates, among other coatings.

In one aspect of the invention, a pre-treatment comprises exposing the substrate to be treated to at least one of an acid, oxidizer, among other compounds. The pre-treatment can be employed for removing excess oxides or scale, equipotentialize the surface for subsequent mineralization treatments, convert the surface into a mineral precursor, among other benefits. Conventional methods for acid cleaning metal surfaces are described in ASM, Vol. 5, Surface Engineering (1994), and U.S. Pat. No. 6,096,650; hereby incorporated by reference.

In one aspect of the invention, the post treatment comprises exposing the substrate to a source of at least one carbonate or precursors thereof. Examples of carbonate comprise at least one member from the group of gaseous carbon dioxide, lithium carbonate, lithium bicarbonate, sodium carbonate, sodium bicarbonate, potassium carbonate, potassium bicarbonate, rubidium carbonate, rubidium bicarbonate, rubidium acid carbonate, cesium carbonate, ammonium carbonate, ammonium bicarbonate, ammonium carbamate and ammonium zirconyl carbonate. Normally, the carbonate source will be water soluble. In the case of a carbonate precursor such as carbon dioxide, the precursor can be passed through a liquid (including the silicate containing medium) and the substrate immersed in the liquid. One specific example of a suitable postreatment is disclosed in U.S. Pat. No. 2,462,763; hereby incorporated by reference. Another specific example of a post treatment comprises exposing a treated surface to a solution obtained by diluting ammonium zirconyl carbonate (1:4) in distilled water (e.g., Bacote® 20 supplied by Magnesium Elektron Corp). If desired, this post treated surface can be topcoated (e.g., aqueous or water borne topcoats).

In another aspect of the invention, the post treatment comprises heating the surface. Typically the amount of heating is sufficient to densify the inventive surface without adversely affecting the physical properties of the underlying metal substrate. Heating can occur under atmospheric conditions, within a nitrogen containing environment, among other gases. If desired, prior to heating the inventive surface can be contacted with a solution containing a material that reacts with the surface at elevated temperatures.

In another aspect of the invention, the post treatment comprises exposing the substrate to a source comprising at least one acid source or precursors thereof. Examples of suitable acid sources comprise at least one member chosen from the group of phosphoric acid, hydrochloric acid, molybdic acid, silicic acid, acetic acid, citric acid, nitric acid, hydroxyl substituted carboxylic acid, glycolic acid, lactic acid, malic acid, tartaric acid, among other acid sources effective at improving at least one property of the treated metal surface. The pH of the acid post treatment can be modified by employing at least one member selected from the group consisting of ammonium citrate dibasic (available commercially as Citrosol® #503 and Multi-prep®), fluoride salts such as ammonium bifluoride, fluoboric acid, fluorosilicic acid, among others. The acid post treatment can serve to activate the surface thereby improving the effectiveness of rinses, sealers and/or topcoatings (e.g., surface activation prior to contacting with a sealer can improve cohesion between the surface and the sealer thereby improving the corrosion resistance of the treated substrate). Normally, the acid source will be water soluble and employed in amounts of up to about 5 wt. % and typically, about 1 to about 2 wt. %.

In another aspect of the invention, the post treatment comprises contacting a surface treated by the inventive process with a rinse. By "rinse" it is meant that an article or a treated surface is sprayed, dipped, immersed or other wise exposed to the rinse in order to affect the properties of the treated surface. For example, a surface treated by the inventive process is immersed in a bath comprising at least one rinse. In some cases, the rinse can interact or react with at least a portion of the treated surface. Further the rinsed surfaced can be modified by multiple rinses, heating, topcoating, adding dyes, lubricants and waxes, among other processes. Examples of suitable compounds for use in rinses comprise at least one member selected from the group of titanates, titanium chloride, tin chloride, zirconates, zirconium acetate, zirconium oxychloride, fluorides such as calcium fluoride, tin fluoride, titanium fluoride, zirconium fluoride; coppurous compounds, ammonium fluorosilicate, metal treated silicas (e.g., Ludox®), silanes, siloxanes, nitrates such as aluminum nitrate; sulphates such as magnesium sulphate, sodium sulphate, zinc sulphate, and copper sulphate; lithium compounds such as lithium acetate, lithium bicarbonate, lithium citrate, lithium metaborate, lithium vanadate, lithium tungstate, among others. The rinse can further comprise at least one organic compound such as vinyl acrylics, fluorosurfactancts, polyethylene wax, among others. Examples of commercially available rinses comprise at least one member selected from the group of Aqualac® (urethane containing aqueous solution), W86®, W87®, B37®, T01®, E10®, among others (a heat cured coating supplied by the Magni® Group), JS2030S (sodium silicate containing rinse supplied by MacDermid Incorporated), JS2040I (a molybdenum containing rinse also supplied by MacDermid Incorporated), EnSeal® C-23 (an acrylic based coating supplied by Enthone), EnSeal® C-26, Enthone® C-40 (a pigmented coating supplied Enthone), Microseal®, Paraclene® 99 (a chromate containing rinse), EcoTri® (a silicate/polymer rinse), MCI Plus OS (supplied by Metal Coatings International), among others. One specific rinse comprises water, water dispersible urethane, and at least one silicate, e.g., refer to commonly assigned U.S. Pat. No. 5,871,668; hereby incorporated by reference. While the rinse can be employed neat, normally the rinse will be dissolved, diluted or dispersed within another medium such as water, organic solvents, among others. While the amount of rinse employed depends upon the desired results, normally the rinse comprises about 0.1 wt % to about 50 wt. % of the rinse medium. The rinse can be employed as multiple applications and, if desired, heated.

The metal surface refers to a metal article or body as well as a non-metallic or an electrically conductive member having an adhered metal or conductive layer. While any suitable surface can be treated by the inventive process, examples of suitable metal surfaces comprise at least one member selected from the group consisting of galvanized surfaces (e.g. the zinc plated metal article from the previous step), sheradized surfaces, zinc, iron, steel, brass, copper, nickel, tin, aluminum, lead, cadmium, magnesium, alloys thereof such as zinc-nickel alloys, tin-zinc alloys, zinc-cobalt alloys, zinc-iron alloys, among others. If desired, the mineral layer can be formed on a non-conductive substrate having at least one surface coated with an electrically conductive material, e.g., a metallized polymeric article or sheet, ceramic materials coated or encapsulated within a metal, among others. Examples of metallized polymer comprise at least one member selected from the group of polycarbonate, acrylonitrile butadiene styrene (ABS), rubber, silicone, phenolic, nylon, PVC, polyimide, melamine, polyethylene, polyproplyene, acrylic, fluorocarbon, polysulfone, polyphenyene, polyacetate, polystyrene, epoxy, among others. Conductive surfaces can also include carbon or graphite as well as conductive polymers (polyaniline for example).

The metal surface can possess a wide range of sizes and configurations, e.g., fibers, coils, sheets including perforated acoustic panels, chopped wires, drawn wires or wire strand/rope, rods, couplers (e.g., hydraulic hose couplings), fibers, particles, fasteners (including industrial and residential hardware), brackets, nuts, bolts, rivets, washers, cooling fins, stamped articles, powdered metal articles, among others. The limiting characteristic of the inventive process to treat a metal surface is dependent upon the ability of the electrical current/energy to contact the metal surface. That is, similar to conventional electroplating technologies, a mineral surface may be difficult to apply upon a metal surface defining hollow areas or voids. This difficulty can be addressed by using a conformal anode.

The inventive process creates a flexible surface that can survive secondary processes, e.g., metal deformation for riveting, sweging, crimping, among other processes, and continue to provide corrosion protection. Such is in contrast to typical corrosion inhibitors such as chromates that tend to crack when the underlying surface is shaped. If desired, the surface formed by the inventive process can be topcoated (e.g, with a fluoroplastic resin), prior to secondary processing. Articles treated in accordance with the inventive process, topcoated and exposed to a secondary process retain their desirable corrosion resistance, coating adhesion, component functionality, among properties.

The inventive process provides a surface (e.g., mineral coating) that can enhance the surface characteristics of the metal or conductive surface such as resistance to corrosion, protect carbon (fibers for example) from oxidation, stress crack corrosion (e.g., stainless steel), hardness, thermal resistance, improve bonding strength in composite materials, provide dielectric layers, improve corrosion resistance of printed circuit/wiring boards and decorative metal finishes, and reduce the conductivity of conductive polymer surfaces including application in sandwich type materials.

The mineral coating can also affect the electrical and magnetic properties of the surface. That is, the mineral coating can impart electrical resistance or insulative properties to the treated surface. By having an electrically non-conductive surface, articles having the inventive layer can reduce, if not eliminate, electro-galvanic corrosion in fixtures wherein current flow is associated with corrosion, e.g., bridges, pipelines, among other articles.

In one aspect of the invention, the inventive process is employed for improving the cracking and oxidation resistance of aluminum, copper or lead containing substrates. For example, lead, which is used extensively in battery production, is prone to corrosion that in turn causes cracking, e.g., inter-granular corrosion. The inventive process can be employed for promoting grain growth of aluminum, copper and lead substrates as well as reducing the impact of surface flaws. Without wishing to be bound by any theory or explanation, it is believed that the lattice structure of the mineral layer formed in accordance with the inventive process on these 3 types of substrates can be a partially polymerized silicate. These lattices can incorporate a disilicate structure, or a chain silicate such as a pyroxene. A partially polymerized silicate lattice offers structural rigidity without being brittle. In order to achieve a stable partially polymerized lattice, metal cations would preferably occupy the lattice to provide charge stability. Aluminum has the unique ability to occupy either the octahedral site or the tetrahedral site in place of silicon. The +3 valence of aluminum would require additional metal cations to replace the +4 valance of silicon. In the case of lead application, additional cation can comprise +2 lead ion.

In an aspect of the invention, an electrogalvanized panel, e.g., a zinc surface, is coated electrolytically by being placed into an aqueous sodium silicate solution. After being placed into the silicate solution, a mineral coating or film containing silicates is deposited by using relatively low voltage potential (e.g., about 1 to about 24 v depending upon the desired current density) and low current. The current density can range from about 0.7 A/in$^2$ to about 0.1 A/in$^2$ at 12 volt constant. Normally, hydrogen is evolved at the workpiece/cathode and oxygen at the anode.

In one aspect of the invention, the workpiece is initially employed as an anode and then electrically switched (or pulsed) to the cathode. By pulsing the voltage, the workpiece can be pre-treated in-situ (prior to interaction with the electrolytic medium). Pulsing can also increase the thickness of the film or layer formed upon the workpiece. If desired, dopants (e.g., cations) can be present in the electrolyte and deposited upon the surface by pulsing either prior to or following mineralization.

In another aspect of the invention, the workpiece is treated by a bipolar technique as described in WO 2004/097069 A2. An apparatus suitable for such dipole coating is described in FIG. 4 and the corresponding passages of the specification of WO 2004/097069 A2, incorporated herein by reference.

The bipolar technique has proven to be particularly advantageous for treating threaded articles as workpieces such as nuts and bolts.

In yet another aspect of the invention, the metal surface, e.g., zinc, aluminum, magnesium, steel, lead and alloys thereof; has an optional pretreatment. By "pretreated" it is meant to refer to a batch or continuous process for conditioning the metal surface to clean it and condition the surface to facilitate acceptance of the mineral or silicate containing coating e.g., the inventive process can be employed as a step in a continuous process for producing corrosion resistant coil steel. The particular pretreatment will be a function of composition of the metal surface and desired functionality of the mineral containing coating/film to be formed on the surface. Examples of suitable pre-treatments comprise at least one of cleaning, e.g., sonic cleaning, activating, heating, degreasing, pickling, deoxidizing, shot glass bead blasting, sand blasting and rinsing. One suitable pretreatment process for steel comprises:

1) 2 minute immersion in a 3:1 dilution of Metal Prep 79 (Parker Amchem),
2) two deionized water rinses,
3) 10 second immersion in a pH 14 sodium hydroxide solution,
4) remove excess solution and allow to air dry,
5) 5 minute immersion in a 50% hydrogen peroxide solution,
6) remove excess solution and allow to air dry.

In another aspect of the invention, the metal surface is pretreated by anodically cleaning the surface. Such cleaning can be accomplished by immersing the work piece or substrate into a medium comprising silicates, hydroxides, phosphates, carbonates, among other cleaning agents. By using the work piece as the anode in a DC cell and maintaining a current of about 10 A/ft$^2$ to about 150 A/ft$^2$, the process can generate oxygen gas. The oxygen gas agitates the surface of the workpiece while oxidizing the substrate's surface. The surface can also be agitated mechanically by using conventional vibrating equipment. If desired, the amount of oxygen or other gas present during formation of the mineral layer can be increased by physically introducing such gas, e.g., bubbling, pumping, among other means for adding gases.

In a further pre-treatment aspect of the invention, the work piece is exposed to the inventive silicate medium as an anode thereby cleaning the work piece (e.g., removing naturally occurring compounds). The work piece can then converted to the cathode and processed in accordance with the inventive methods.

In a further aspect of the invention, the silicate medium is modified to include at least one dopant material. The amount of dopant can vary depending upon the properties of the dopant and desired results. Typically, the amount of dopant will range from about 0.001 wt. % to about 5 wt. % (or greater so long as the electrolyte is not adversely affected. Examples of suitable dopants comprise at least one member selected from the group of water soluble salts, oxides and precursors of tungsten, molybdenum, chromium, titanium (titantates), zircon, vanadium, phosphorus, aluminum (aluminates), iron (e.g., iron chloride), boron (borates), bismuth, gallium, tellurium, germanium, antimony, niobium (also known as columbium), magnesium and manganese, sulfur, zirconium (zirconates) mixtures thereof, among others, and usually, salts and oxides of aluminum and iron. The dopant can comprise at least one of molybdenic acid, fluorotitanic acid and salts thereof such as titanium hydrofluoride, ammonium fluorotitanate, ammonium fluorosilicate and sodium fluorotitanate; fluorozirconic acid and salts thereof such as $H_2ZrF_6$, $(NH_4)_2ZrF_6$ and $Na_2ZrF_6$; among others. Alternatively, dopants can comprise at least one substantially water insoluble material such as electropheritic transportable polymers, PTFE, boron nitride, silicon carbide, silicon nitride, aluminum nitride, titanium carbide, diamond, titanium diboride, tungsten carbide, metal oxides such as cerium oxide, powdered metals and metallic precursors such as zinc, among others.

The aforementioned dopants that can be employed for enhancing the mineral layer formation rate, modifying the chemistry and/or physical properties of the resultant layer, as a diluent for the electrolyte or silicate containing medium, among others. Examples of such dopants are iron salts (ferrous chloride, sulfate, nitrate), aluminum fluoride, fluorosilicates (e.g., $K_2SiF_6$), fluoroaluminates (e.g., potassium fluoroaluminate such as $K_2AlF_5$—$H_2O$), mixtures thereof, among other sources of metals and halogens. The dopant materials can be introduced to the metal or conductive surface in pretreatment steps prior to electrodeposition, in post treatment steps following electrodeposition (e.g., rinse), and/or by alternating electrolytic contacts in solutions of dopants and solutions of silicates if the silicates will not form a stable solution with the dopants, e.g., one or more water soluble dopants. The presence of dopants in the electrolyte solution can be employed to form tailored surfaces upon the metal or conductive surface, e.g., an aqueous sodium silicate solution containing aluminate can be employed to form a layer comprising oxides of silicon and aluminum. That is, at least one dopant (e.g., zinc) can be co-deposited along with at least one siliceous species (e.g., a mineral) upon the substrate.

Moreover, the aforementioned rinses can be modified by incorporating at least one dopant. The dopant can employed for interacting or reacting with the treated surface. If desired, the dopant can be dispersed in a suitable medium such as water and employed as a rinse.

The silicate medium can be modified by adding water/polar carrier dispersible or soluble polymers, and in some cases the electro-deposition solution itself can be in the form of a flowable gel consistency having a predetermined viscosity. If utilized, the amount of polymer or water dispersible materials normally ranges from about 0 wt. % to about 10 wt. %. Examples of polymers or water dispersible materials that can be employed in the silicate medium comprise at least one member selected from the group of acrylic copolymers (supplied commercially as Carbopol®), hydroxyethyl cellulose, clays such as bentonite, fumed silica, solutions comprising sodium silicate (supplied commercially by MacDermid as JS2030S), among others. A suitable composition can be obtained in an aqueous composition comprising about 3 wt % N-grade Sodium Silicate Solution (PQ Corp), optionally about 0.5 wt % Carbopol EZ-2 (BF Goodrich), about 5 to about 10 wt. % fumed silica, mixtures thereof, among others. Further, the aqueous silicate solution can be filled with a water dispersible polymer such as polyurethane to electro-deposit a mineral-polymer composite coating. The characteristics of the electro-deposition solution can also be modified or tailored by using an anode material as a source of ions which can be available for codeposition with the mineral anions and/or one or more dopants. The dopants can be useful for building additional thickness of the electrodeposited mineral layer.

The silicate medium can also be modified by adding at least one diluent or electrolyte. Examples of suitable diluent comprise at least one member selected from the group of sodium sulphate, surfactants, de-foamers, colorants/dyes, among others. The diluent (e.g., sodium sulfate) can be employed for improving the electrical conductivity of bath, reducing the affects of contaminants entering the silicate medium, reducing bath foam, among others. When the diluent is employed as a defoamer, the amount normally comprises less than about 5 wt. % of the electrolyte, e.g., about 1 to about 2 wt. %. A diluent for affecting the electrical conductivity of the bath or electrolyte is normally in employed in an amount of about 0 wt. % to about 20 wt. %.

The following sets forth the parameters which may be employed for tailoring the inventive process to obtain a desirable mineral containing coating:

1. Voltage
2. Current Density
3. Apparatus or Cell Design
4. Deposition Time
5. Programmed current and voltage variations during processing
6. Concentration of the silicate solution
7. Type and concentration of anions in solution
8. Type and concentration of cations in solution
9. Composition/surface area of the anode
10. Composition/surface area of the cathode
11. Temperature
11. Pressure
12. Type and Concentration of Surface Active Agents The specific ranges of the parameters above depend upon the substrate to be treated, and the intended composition to be deposited. Normally, the temperature of the electrolyte bath ranges from about 25 to about 95° C. (e.g., about 75° C.), the voltage from about 6 to 24 volts, an electrolyte solution concentration from about 5 to about 15 wt. % silicate, the current density ranges from about 0.025 A/in² and greater than 0.60 A/in² (e.g., about 180 to about 200 mA/cm2 and normally about 192 mA/cm²), contact time with the electrolyte from about 10 seconds to about 50 minutes and normally about 1 to about 15 minutes and anode to cathode surface area ratio of about 0.5:1 to about 2:1. Items 1, 2, 7, and 8 can be especially effective in tailoring the chemical and physical characteristics of the coating. That is, items 1 and 2 can affect the deposition time and coating thickness whereas items 7 and 8 can be employed for introducing dopants that impart desirable chemical characteristics to the coating. The differing types of anions and cations can comprise at least one member selected from the group consisting of Group I metals, Group II metals, transition and rare earth metal oxides, oxyanions such as molybdate, phosphate, titanate, boron nitride, silicon carbide, aluminum nitride, silicon nitride, mixtures thereof, among others.

The typical process conditions will provide an environment wherein hydrogen is evolved at the cathode and oxygen at the anode. Without wishing to be bound by any theory or explanation, it is believed that the hydrogen evolution provides a relatively high pH at the surface to be treated. It is also believed that the oxygen reduced or deprived environment along with a high pH can cause an interaction or a reaction at the surface of the substrate being treated. It is further believed that zinc can function as a barrier to hydrogen thereby reducing, if not eliminating, hydrogen embrittlement being caused by operating the inventive process.

The inventive process can be modified by employing apparatus and methods conventionally associated with electroplating processes. Examples of such methods include pulse plating, horizontal plating systems, barrel, rack, adding electrolyte modifiers to the silicate containing medium, employing membranes within the bath, among other apparatus and methods.

The inventive process can be modified by varying the composition of the anode. Examples of suitable anodes comprise graphite, platinum, zinc, iron, steel, iridium oxide, beryllium oxide, tantalum, niobium, titanium, nickel, Monel® alloys, pallidium, alloys thereof, among others. The anode can comprise a first material clad onto a second, e.g., platinum plated titanium or platinum clad niobium mesh. The anode can possess any suitable configuration, e.g., mesh adjacent to a barrel plating system. In some cases, the anode (e.g., iron or nickel) can release ions into the electrolyte bath that can become incorporated within the mineral layer. Normally, ppm concentrations of anode ions are sufficient to affect the mineral layer composition. If a dimensionally stable anode is desired, then platinum clad or plated niobium can be employed. In the event a dimensionally stable anode requires cleaning, in most cases the anode can be cleaned with sodium hydroxide solutions. Anode cleaning can be enhanced by using heat and/or electrical current.

The inventive process can be practiced in any suitable apparatus. Examples of suitable apparatus comprise rack and barrel plating, brush plating, horizontal plating, continuous lengths, among other apparatus conventionally used in electroplating metals. The workpiece is subjected to the inventive electrolytic method thereby forming a mineral coating upon at least a portion of the workpiece surface. After formation of the mineral coating the workpiece is removed from the electrolytic environment, dried and rinsed with water, e.g, a layer comprising, for example, silica and/or sodium carbonate can be removed by rinsing.

Whether or not the workpiece is rinsed, the inventive process can impart improved corrosion resistance without using chromates (hex or trivalent). When a zinc surface is treated by the inventive process, the thickness (or total amount) of zinc can be reduced while achieving equivalent, if not improved, corrosion resistance. For example, when exposing a steel article to a zinc plating environment for a period of about 2.5 to about 30 minutes and then to the inventive process for a period of about 2.5 to about 30 minutes white rust first occurs from about 24 hours to about 120 hours (when tested in accordance with ASTM B-117), and red rust failure occurs from about 100 to about 800 hours. As a result, the inventive process permits tailoring the amount of zinc to a desired level of corrosion resistance. If desired, the corrosion resistance can be improved further by applying at least one topcoating.

The inventive process also imparts improved torque tension properties in comparison to conventional chromate processes (hex or trivalent). Wilson-Garner M10 bolts were coated with conventional zinc and yellow hexavalent chromate, and treated in accordance with the inventive process. The torque tension of these bolts was tested in accordance with test protocol USCAR-11 at forces from about 20,000 to about 42,300 Newtons. The standard deviation for the peak torque for the conventional zinc/yellow chromate treated bolts was about 5.57 Nm with a three-sigma range of about 33.4, and about 2.56 Nm with a three-sigma range of 15.4 for bolts treated in accordance with the inventive process.

The surface formed by the inventive process may or may not be rinsed prior to applying a topcoat. Normally, the surface formed by the inventive process will be rinsed, e.g., with at least one of deionized water, silane or a carbonate, prior to applying a topcoat, e.g. a fluoroplastic resin.

Without wishing to be bound by any theory or explanation a silica containing layer can be formed upon the mineral. The silica containing layer can be chemically or physically modified and employed as an intermediate or tie-layer. The tie-layer can be used to enhance bonding to paints, coatings, metals, glass, among other materials contacting the tie-layer. This can be accomplished by binding to the top silica containing layer one or more materials which contain alkyl, fluorine, vinyl, epoxy including two-part epoxy and powder paint systems, silane, hydroxy, amino, mixtures thereof, among other functionalities reactive to silica or silicon hydroxide. Alternatively, the silica containing layer can be removed by using conventional cleaning methods, e.g, rinsing with de-ionized water. The silica containing tie-layer can be relatively thin in comparison to the mineral layer 100–500 angstroms compared to the total thickness of the mineral which can be 1500–2500 angstroms thick. If desired, the silica containing layer can be chemically and/or physically modified by employing the previously described post-treatments, e.g., exposure to at least one carbonate or acid source. The post-treated surface can then be contacted with a topcoat, e.g, a fluoroplastic resin.

In another aspect, the mineral without or without the aforementioned silica layer functions as an intermediate or tie-layer for one or more secondary coatings, e.g., silane containing secondary coatings. Examples of such secondary coatings and methods that can be complimentary to the instant invention are described in U.S. Pat. Nos. 5,759,629; 5,750,197; 5,539,031; 5,498,481; 5,478,655; 5,455,080; and 5,433,976. The disclosure of each of these U.S. patents is hereby incorporated by reference. For example, improved corrosion resistance of a metal substrate can be achieved by using a secondary coating comprising at least one suitable silane in combination with a mineralized surface. Examples of suitable silanes comprise at least one members selected from the group consisting of tetra-ortho-ethyl-silicate (TEOS), bis-1,2-(triethoxysilyl)ethane (BSTE), vinyl silane or aminopropyl silane, epoxy silanes, alkoxysilanes, among other organo functional silanes. The silane can bond with the mineralized surface and then the silane can cure thereby providing a protective top coat, or a surface for receiving an outer coating or layer. In some cases, it is desirable to sequentially apply the silanes. For example, a steel substrate, e.g., a fastener, can be treated to form a mineral layer, allowed to dry, rinsed in deionized water, coated with a 5% BSTE solution, coated again with a 5% vinyl silane solution, and powder coated with a thermoset epoxy paint (Corvel 10-1002 by Morton) at a thickness of 2 mils. The steel substrate was scribed using a carbide tip and exposed to ASTM B117 salt spray for 500 hours. After the exposure, the substrates were removed and rinsed and allowed to dry for 1 hour. Using a spatula, the scribes were scraped, removing any paint due to undercutting, and the remaining gaps were measured. The tested substrates showed no measurable gap beside the scribe.

The inventive process forms a surface that has improved adhesion to outer coatings or layers, e.g., secondary coatings such as, for example, fluoroplastic resins. By selecting appropriate rinses, secondary and outer coatings for application upon the mineral, a corrosion resistant article can be obtained without chromating or phosphating. Such a selection can also reduce usage of zinc to galvanize iron containing surfaces, e.g., a steel surface is mineralized, coated with a silane containing coating and with an outer coating comprising an epoxy.

Without wishing to be bound by any theory or explanation, it is believed that the inventive process forms a surface that can release or provide water or related moieties. These moieties can participate in a hydrolysis or condensation reaction that can occur when an overlying rinse, seal or topcoating cures. Such participation improves the cohesive bond strength between the surface and overlying cured coating.

In one aspect of the invention, the mineral coating of the zinc plated article obtained in step 1 is effected by (a) immersing the article in an alkaline aqueous medium containing silicate (e.g. sodium silicate); (b) introducing an electric current to said medium wherein said article is employed as a cathode and thereby forming a silicate layer on the surface of the article; (c) rinsing the article with water; (d) drying the article.

Whereas a person of skill in the art will appreciate that a wide variation of process parameters is possible, the following parameters, alone or in combination, were found to be useful in producing a silicate layer in the protective coating of brake pipes for motor vehicles:

silicate concentration in medium: 1 to 25 wt. %;
pH of medium: 10 to 11.5
current density: 1.5 to 2.5 A/dm$^2$
temperature of medium: 70 to 80° C.
thickness of silicate layer formed: 50 to 800 Angstroms
drying temperature: >60° C., in particular 100 to 140° C.

The silicate coated article is rinsed with fresh water and then dried immediately after its formation. Drying can be effected, for example, in an oven or by blowing hot air over the coated article. If desired, the silicate coating article can be dried prior to rinsing (e.g., immediately dried after its formation and then rinsed). Care should be taken to ensure that drying is sufficient to prevent water or silicate solution remaining on the article in amounts that would deleteriously affect the plastic coating next applied.

4. Lubricant Layer

After the silicate coating is dried, a coating of lubricant material is applied over the silicate layer.

The lubricant material applied according to this invention comprises a lubricant that is suitable for coating of threaded fastening elements. Such lubricants are, for example, defined in specification no. VDA 235-101 dated October 1999 of the German Automobile Association. While there is no particular restriction with regard to the selection of the lubricant used in the process of the instant invention, it is desirable that the lubricant has the properties listed in point 2 of VDA 235-101 dated October 1999. Such lubricants are generally known and widely used in the art.

Examples for suitable lubricants for this purpose include molybdenum sulfide, fluorinated polymers (in particular teflon), waxes (in particular polymer based waxes such as polyethylene waxes, polyvinylether waxes, ethylene copolymer waxes, montanic acid waxes, and montanic ester waxes), wax esters, paraffines, stearates, graphite, oils (in particular silicon oils), and mixtures hereof.

According to one embodiment of the invention, the lubricant used is a polymer based wax, such as, for example, a polyethylene wax, a polyvinylether wax, an ethylene copolymer wax, a montanic acid wax, and/or a montanic ester wax. Such polymer based waxes have the advantage that they can be applied to the workpiece in the form of an aqueous dispersion. Furthermore, it was found that such polymer based waxes work particularly well when applied to the silicate layer of the instant invention. The lubricant layer may be formed by immersing the workpiece in a lubricant medium such as, for example, an aqueous dispersion of the lubricant, removing excess lubricant medium, if any, and subsequently drying the work piece. Removing excess lubricant medium can be effected, for example, by using a centrifuge. Drying of the work piece can be effected, for example, by allowing hot air (e.g., at temperatures of 40 to 100° C.) to pass by the work pieces.

According to a further embodiment of the instant invention, the lubricant layer additionally contains at least one corrosion protection agent such as, for example, an acrylate dispersion, in an amount of, for example, 0.01 to 10 wt. %, in order to enhance the corrosion resistance properties of the article.

The lubricant layer is usually applied at a thickness of, for example, about 0.01 to about 5 micrometers, in particular of about 0.1 to about 1 micrometers.

Optionally, the protective coating further comprises one or several corrosion protection layers that are interposed between the silicate layer and the lubricant layer. Applying such a layer can further enhance the corrosion resistance of the article.

Suitable corrosion protection agents for threaded mechanical fastening elements are well known in the art and include, for example, acrylate dispersions. The corrosion protection layer can be applied as a single layer or, optionally, as two or more layers.

The application of the corrosion protection layer can be effected by any suitable method such as spraying, showering, immersing, and/or brush-coating. In case of using, for example, acrylate dispersions, the primer can be formed by immersing and subsequent air drying.

Typically, the corrosion protection layer is applied at a thickness of, for example, about 0.1 to about 20 micrometers.

The following Examples are provided to illustrate certain aspects of the invention and it is understood that such an Example does not limit the scope of the invention as defined in the appended claims.

EXAMPLE 1

A M8 standard bolt of 45 mm length with a metric thread of the type as depicted in FIG. 1 were barrel coated in a process in accordance with the following procedure:

(1) Bolt: M8 standard bolt of 45 mm length with a metric thread.

(2) Zinc plating layer: A zinc plating layer of about 10 micrometer thickness was cathodically formed on the outer surface of the bolt by employing a potassium based zinc bath at pH 5.5 to 6.0 containing 40 g/l Zn$^{2+}$ (as ZnCl$_2$), 135 g/l chloride (as KCl and ZnCl$_2$), and 25 g/l boric acid and additionally wetting agents and brighteners and applying an electric current at a density of 0.5–1 A/dm$^2$ at a temperature of 25–32° C.

Prior to zinc electroplating the bolt was thoroughly cleaned by placing it, consecutively, in an alkaline soak bath (100 g/l NaOH+tensides at 60–70° C.) an acidic pickle bath (50% HCl at 23° C.), and an alkaline electrolyte bath (50 g/l NaOH+20 g/l sodium gluconate at 60–70° C.).

After zinc electroplating, the coated bolt was rinsed with water by placing it in a rinse bath.

(3) Silicate film: A silicate film of approximately 200–300 Å thickness was cathodically formed on the zinc plating layer obtained in step (2) by employing an alkaline electrolyte (pH 10.6) containing 10% by weight sodium silicate (Na$_2$SiO$_3$) in water and applying an electric current at a density of 0.5–1 A/dm$^2$ at a temperature of 75° C. for about 15 minutes in a barrel.

After passing the silicate electrolyte bath the coated bolts were immediately rinsed with water by placing it in a rinse bath. After rinsing, the bolt was placed in an oven, heated to 95° C. and dried at this temperature for 10–15 minutes.

(4) Lubricant layer: A lubricant layer composed of polyethylene wax was applied by flushing the dried coated bolt subjected to treatments (2) and (3) above with a dispersion of polyethylene wax (Microgleit® 911, Microgleit Spezialschmierstoffe GmbH, Hohenwart, Germany) in water. After flushing, the bolts were centrifuged and air dried at 70° C. The lubricant layer had a thickness of approximately 0.5 to 1 micrometers.

(5) Testing: The total coefficient of friction ($\mu_{total}$) of the bolts was determined in accordance with DIN 948 (October 1991). The bolts were fastenened and loosened for 10 times. The total coefficient of friction ($\mu_{total}$) of the bolts was determined after each fastening. The test results are summarized in Table 1.

The temperature dependence of the ratio R of the loosening torque N2 to the fastening torque N1 of the bolts was determined by measuring the fastening torque N1 (in Nm) and the loosening torque N2 (in Nm) of the bolts at each of the following conditions:

(a) fastening and loosening the bolt at 23° C.;

(b) subsequent to the previous step: fastening the article at 23° C., increasing the temperature of the article to 150° C., loosening the article after 1 h at 150° C.;

(c) subsequent to the previous steps: fastening the article at 150° C., increasing the temperature of the article to 200° C., loosening the article after 1 h at 200° C.;

(d) subsequent to the previous steps: fastening the article at 200° C., decreasing the temperature of the article to 23° C., loosening the article after 1 h at 23° C.

The ratio R N2/N1 (in %) of loosening torque to fastening torque was determined by the following equation:

$$R[\%] = 100 \times N2/N1$$

The test results are summarized in Table 1.

TABLE 1

|  | 1st Fastening | 2nd Fastening | 3rd Fastening | 4th Fastening |
|---|---|---|---|---|
| μ (total) | 0.07 | 0.07 | 0.06 | 0.07 |
| R N2/N1 (%) | 64.5% at 23° C. | | 67.8% at 150° C. | |

|  | 5th Fastening | 6th Fastening | 7th Fastening | 8th Fastening |
|---|---|---|---|---|
| μ (total) | 0.06 | 0.08 | 0.08 | 0.07 |
| R N2/N1 (%) | 51.2% at 200° C. | | 60.9% at 23° C. | |

|  | 9th Fastening | 10th Fastening |
|---|---|---|
| μ (total) | 0.07 | 0.07 |
| R N2/N1 (%) | not determined | |

The Example shows that the bolts having the mineral coating system of the instant invention have excellent friction properties with the measured total coefficients of friction falling in the narrow range of 0.06 to 0.08 even after several times of fastening and loosening. Furthermore, the results show that the bolts exhibit an excellent temperature resistance with the loosening torque of the bolts remaining above 50% of the fastening torque even after heating to 150 and 200° C., respectively. Finally, the bolts exhibited excellent optical properties as well as corrosion properties and were successfully used as wheel bolts in automobiles.

COMPARISON EXAMPLE

A M8 standard bolt of 45 mm length with a metric thread of the type as depicted in FIG. 1 were coated in a batch process in accordance with the following procedure:

(1) Bolt: M8 standard bolt of 45 mm length with a metric thread (2) A zinc plating layer of approximately 15 μm thickness was formed in the same manner as in step (2) of the previous Example.

(3) A chromium (III) plating layer of about 20 to 100 nanometers thickness was formed on the outer surface of the zinc plated bolt by placing the barrel for about 30 to 45 seconds in an acidic aqueous passivation bath at a temperature of 23–25° C. The passivation bath was prepared in the following manner: (a) preparing an aqueous solution of 150 g/l $Cr(NO_3)_3.9H_2O$, 40 g/l NaCl, and 100 g/l $NaNO_3$; (b) diluting the solution from step (a) with water so that the resulting solution contains 25 ml/l of the solution from step (a); and (c) adjusting the pH of the solution to about 1.8 with $HNO_3$.

(4) A lubricant layer of approximately 0.5 to 1 micrometer thickness was formed in the same manner as in step (4) of the previous Example.

(5) Testing: The total coefficient of friction ($\mu_{total}$) of the bolts and the temperature dependence of the ratio R of the loosening torque N2 to the fastening torque N1 of the bolts was determined in the same manner as in the previous Example. The test results are summarized in Table 2.

TABLE 2

|  | 1st Fastening | 2nd Fastening | 3rd Fastening | 4th Fastening |
|---|---|---|---|---|
| μ (total) | 0.07 | 0.08 | 0.08 | 0.09 |
| R N2/N1 (%) | 61.3% at 23° C. | | 43.7% at 150° C. | |

|  | 5th Fastening | 6th Fastening | 7th Fastening | 8th Fastening |
|---|---|---|---|---|
| μ (total) | 0.09 | 0.09 | 0.10 | 0.10 |
| R N2/N1 (%) | 40.0% at 200° C. | | 58.8% at 23° C. | |

|  | 9th Fastening | 10th Fastening |
|---|---|---|
| μ (total) | 0.11 | 0.11 |
| R N2/N1 (%) | not determined | |

The Comparison Example shows that the chromium (III) coating system yields satisfactory friction properties, the temperature resistance of the bolts is insufficient, with the loosening torque of the bolts going down to 43.7 and 40% of the fastening torque after heating to 150 and 200° C., respectively. Due to their insufficient temperature resistance, the bolts of the Comparison Example are not suited for use as wheel bolts in automobiles.

The principle of the invention and the best mode contemplated for applying that principle have been described. It is to be understood that the foregoing is illustrative only and that other means and techniques can be employed without departing from the true scope of the invention defined in the following claims.

The invention claimed is:

1. A corrosion resistant article comprising a threaded metal body and a protective coating applied on at least one surface of said metal body, said protective coating comprising:

a zinc layer comprising zinc;

a silicate layer comprising at least one silicate; and a lubricant layer comprising at least one lubricant;

wherein said article has a total coefficient of friction $\mu_{total}$ as determined by DIN 946 of about 0.05 to about 0.20.

2. The article of claim 1, wherein said protective coating is substantially trivalent and hexavalent chromate free.

3. The article of claim 1 or 2, wherein said metal body comprises at least one metal selected from the group consisting of steel, stainless steel, aluminum, iron, nickel, copper, zinc, magnesium, and alloys thereof.

4. The article of any one of claims 1 or 2, wherein said metal body comprises a threaded surface for engaging a corresponding threaded mating part.

5. The article of any one of claims 1 or 2, wherein said metal body a bolt or a nut for automobile wheels.

6. The article of claim 4 wherein the loosening torque of the article amounts to at least 50% of the fastening torque, the loosening and fastening torques being determined at at least one of the following conditions:
   (a) fastening and loosening the article at 23° C.;
   (b) subsequent to the previous step: fastening the article at 23° C., increasing the temperature of the article to 150° C., loosening the article after 1 h at 150° C.;
   (c) subsequent to the previous steps: fastening the article at 150° C., increasing the temperature of the article to 200° C., loosening the article after 1 h at 200° C.;
   (d) subsequent to the previous steps: fastening the article at 200° C., decreasing the temperature of the article to 23° C., loosening the article after 1 h at 23° C.

7. The article of claim 6, wherein the loosening torque amounts to at least 50% of the fastening torque under each of the conditions (a) to (d).

8. The article of any one of claims 1 or 2, wherein said zinc layer comprises electrolytically applied zinc.

9. The article of any one of claims 1 or 2, wherein said zinc layer has a thickness of about 0.1 to about 40 micrometers.

10. The article of any one of claims 1 or 2, wherein said silicate layer contains an alkali silicate.

11. The article of any one of claims 1 or 2, wherein said silicate layer comprises a disilicate mineral structure.

12. The article of any one of claims 1 or 2, wherein said silicate layer has a thickness of 50 to 800 Å.

13. The article of any one of claims 1 or 2, wherein said silicate layer comprises electrolytically applied silicate.

14. The article of any one of claims 1 or 2, wherein said lubricant comprises at least one member selected from the group consisting of molybdenum sulfide, fluorinated polymers, waxes, in particular polymer based waxes, wax esters, paraffines, stearates, graphite, and oils.

15. The article of any one of claims 1 or 2, wherein said lubricant comprises at least one member selected from the group consisting of polyethylene waxes, polyvinylether waxes, ethylene copolymer waxes, montanic acid waxes, and montanic ester waxes.

16. The article of any one of claims 1 or 2 wherein the lubricant layer has a thickness of about 0.01 to about 5 micrometers.

17. The article of anyone of claims 1 or 2, wherein said protective coating further comprises at least one corrosion protection layer comprising at least one anti-corrosion agent, said corrosion protection layer being interposed between the silicate layer and the lubricant layer.

18. The article of claim 17, wherein said corrosion protection layer comprises an acrylate dispersion as anti-corrosion agent.

19. The article of claim 17, wherein said corrosion protection layer has a thickness of about 0.01 to about 20 micrometers.

20. The article of claim 1 wherein said article comprises a corrosion resistant nut or bolt in motor vehicles.

* * * * *